(12) United States Patent
Twombly et al.

(10) Patent No.: US 11,716,290 B1
(45) Date of Patent: Aug. 1, 2023

(54) ELECTRONIC SYSTEM FOR DYNAMIC LINKING OF RESOURCE DATA STRUCTURES ACROSS DISTRIBUTED NETWORKS

(71) Applicant: BANK OF AMERICA CORPORATION, Charlotte, NC (US)

(72) Inventors: Steven Michael Twombly, Saco, ME (US); Tony England, Tega Cay, SC (US); Robertson Walters Greenbacker, Charlotte, NC (US); Bradley Ryan Holland, Huntersville, NC (US); Sara A. Walsh, West Chester, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/743,384

(22) Filed: May 12, 2022

(51) Int. Cl.
| | | |
|---|---|---|
| H04L 12/24 | (2006.01) | |
| H04L 29/08 | (2006.01) | |
| H04L 41/0893 | (2022.01) | |
| H04L 41/084 | (2022.01) | |
| H04L 47/70 | (2022.01) | |
| H04L 47/762 | (2022.01) | |

(52) U.S. Cl.
CPC .......... *H04L 47/828* (2013.01); *H04L 47/762* (2013.01); *H04L 47/822* (2013.01); *H04L 47/827* (2013.01)

(58) Field of Classification Search
None
See application file for complete search history.

(56) References Cited

U.S. PATENT DOCUMENTS

| | | |
|---|---|---|
| 8,620,790 B2 | 12/2013 | Priebatsch |
| 8,789,162 B2 | 7/2014 | Radhakrishnan |
| 8,893,250 B2 | 11/2014 | Mattsson et al. |
| 8,924,292 B1 | 12/2014 | Ellis et al. |
| 9,069,943 B2 | 6/2015 | Radhakrishnan et al. |
| 9,652,764 B2 | 5/2017 | Bondesen et al. |
| 10,237,294 B1 * | 3/2019 | Zadeh ............... H04L 61/45 |
| 10,437,635 B2 * | 10/2019 | Layman ............ G06F 11/3006 |
| 10,594,576 B2 * | 3/2020 | Cavuto ............... H04L 43/08 |
| 10,664,833 B2 | 5/2020 | Radu |
| 10,756,991 B2 * | 8/2020 | Layman ........... G06Q 10/06316 |

(Continued)

*Primary Examiner* — Christopher B Robinson
(74) *Attorney, Agent, or Firm* — Moore & Van Allen PLLC; Vaidehi Bachoti

(57) ABSTRACT

Embodiments of the invention are directed to systems, methods, and computer program products for dynamic linking of resource data structures across distributed networks. The system is structured for enhancing data security by evaluating and determining iterations of data transformations associated with resource data structures across networks and establishing deletion and usage modification mechanisms for stored unauthorized downstream iterations. The system is structured to link a first front end resource data structure and a downstream transformation comprising a first entity resource data structure. The system is structured to construct a real-time interactive technology resource interface such that the technology resource interface is structured to present graphical interface objects associated with the link between the first front end resource data structure and the first entity resource data structure.

20 Claims, 5 Drawing Sheets

(56) References Cited

U.S. PATENT DOCUMENTS

| | | |
|---|---|---|
| 10,853,791 B1 | 12/2020 | Ellis et al. |
| 11,062,319 B1 | 7/2021 | Hecht et al. |
| 11,188,897 B2 | 11/2021 | Kurian |
| 11,190,422 B2 * | 11/2021 | Cavuto ............... H04L 43/08 |
| 11,271,939 B2 * | 3/2022 | Apostolopoulos ..... G06N 20/00 |
| 2013/0073459 A1 | 3/2013 | Zacarias et al. |
| 2013/0304651 A1 | 11/2013 | Smith |
| 2014/0279554 A1 | 9/2014 | Priebatsch et al. |
| 2014/0337175 A1 | 11/2014 | French et al. |
| 2015/0046339 A1 | 2/2015 | Wong et al. |
| 2015/0081557 A1 | 3/2015 | Kinfoil et al. |
| 2015/0081567 A1 | 3/2015 | Boyle et al. |
| 2015/0120569 A1 | 4/2015 | Belshe et al. |
| 2015/0206137 A1 | 7/2015 | Mazarim Fernandes |
| 2015/0254664 A1 | 9/2015 | Bondesen et al. |
| 2018/0108008 A1 | 4/2018 | Chumbley |
| 2019/0303919 A1 | 10/2019 | Aabye et al. |
| 2021/0174345 A1 | 6/2021 | Von Behren et al. |

\* cited by examiner

ELECTRONIC SYSTEM FOR DYNAMIC LINKING OF RESOURCE DATA STRUCTURES ACROSS DISTRIBUTED NETWORKS

FIELD OF THE INVENTION

The present invention generally relates to the field of dynamic linking of resource data structures across distributed networks. Embodiments of the invention are configured for enhancing data security by evaluating and determining iterations of data transformations associated with resource data structures across networks and establishing deletion and usage modification mechanisms for stored unauthorized downstream iterations.

BACKGROUND

Proliferation of electronic technology has generated innumerable transmissions of immense volume of data across various distributed networks for various technology activities. Distributed network environments provide a variety of user technology resource components applications (e.g., front-end technology applications, client facing technology applications, web services, etc.) to users, various entity systems and devices, back-end technology resource components (e.g., back-end systems), and/or the like. Typically, performing a particular technology activity requires operative and compatible interaction, and data transmission between a variety of systems and applications across various distributed networks. For instance, an activity initiated at a source node such as a front end or edge node at a first network may involve data from the source node to be transmitted to another destination/downstream node at another entity network, e.g., via one or more intermediary nodes such as systems and/or applications therebetween along the transmission path between the source node and the destination node. Accordingly, a need exists for dynamic linking of resource data structures across distributed networks.

The previous discussion of the background to the invention is provided for illustrative purposes only and is not an acknowledgement or admission that any of the material referred to is or was part of the common general knowledge at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for dynamic linking of resource data structures across distributed networks. The system is structured for enhancing data security by evaluating and determining iterations of data transformations associated with resource data structures across networks and establishing deletion and usage modification mechanisms for stored unauthorized downstream iterations. Typically the system comprises: at least one memory device with computer-readable program code stored thereon; at least one communication device; at least one processing device operatively coupled to the execution module and the analysis module, the at least one memory device and the at least one communication device. Executing the computer-readable code is configured to cause the at least one processing device to: receive, from a first network device, a technology resource request associated with determining data transformations associated with a first front end resource data structure associated with a user; determine one or more resource data activities performed using the first front end resource data structure; determine, for each of the one or more resource data activities, an associated downstream entity network that was a recipient of data associated with the first front end resource data structure; construct a downstream data transformation query for an entity network system of each of the one or more downstream entity networks, such that the downstream data transformation query is structured to retrieve a response from the entity network system of each of the one or more downstream entity networks regarding whether the one or more downstream entity networks has created a data transformation associated with the first front end resource data structure; transmit, to each of the entity network system of the one or more downstream entity networks, the associated downstream data transformation query; receive, from a first entity network system of a first downstream entity network of the one or more downstream entity networks, a first entity response indicating that a first entity resource data structure associated with the first front end resource data structure was created by the first downstream entity network, wherein the first entity resource data structure is a downstream transformation of the first front end resource data structure; in response to the first entity response, link the first front end resource data structure and the first entity resource data structure; construct a real-time interactive technology resource interface such that the technology resource interface is structured to present graphical interface objects associated with the link between the first front end resource data structure and the first entity resource data structure; and initiate presentation, via a display device of a user device associated with the user, of the real-time interactive technology resource interface.

In some embodiments, or in combination with any of the previous embodiments, determining one or more resource data activities performed using the first front end resource data structure further comprises: determining a user device resource application stored on the user device where the user has input data associated with the first front end resource data structure; analyzing the user device resource application to determine whether the user device resource application has created a data transformation associated with the first front end resource data structure; identifying a first device application resource data structure associated with the first front end resource data structure stored by the user device resource application, wherein the first device application resource data is a downstream transformation of the first front end resource data structure and an upstream transformation of the first entity resource data structure; and determining the one or more resource data activities based on activities of the user device resource application.

In some embodiments, or in combination with any of the previous embodiments, the invention is further configured to: link (i) the first front end resource data structure and the first device application resource data structure, and (ii) the first device application resource data structure and the first entity resource data structure; construct the real-time interactive technology resource interface such that the technology resource interface is structured to present graphical interface objects associated with the links between the first front end resource data structure, the first device application resource data, and the first entity resource data structure.

In some embodiments, or in combination with any of the previous embodiments, determining one or more resource data activities performed using the first front end resource data structure further comprises: determining a creation time associated with the first device application resource data structure by the user device resource application; determining an activity log associated with the first entity resource data structure; and truncating the activity log based on the creation time associated with the first device application resource data structure such that the truncated activity log comprises the one or more resource data activities performed using the first front end resource data structure.

In some embodiments, or in combination with any of the previous embodiments, determining one or more resource data activities performed using the first front end resource data structure further comprises determining activities performed by the user device resource application using the first device application resource data structure.

In some embodiments, or in combination with any of the previous embodiments, determining, for each of the one or more resource data activities, the associated downstream entity network, further comprises tracking resource data transmissions associated with the one or more resource data activities.

In some embodiments, or in combination with any of the previous embodiments, the invention is further configured to: determine a modification to the data associated with the first front end resource data structure; update the data associated with the first front end resource data structure to create an updated front end resource data structure; determine redundant data associated with downstream transformations of the first front end resource data structure, comprising determining (i) the first device application resource data structure constructed by the user device resource application, and (ii) the first entity resource data structure constructed by the first downstream entity network; transmit a first control instruction to the user device resource application to modify the first device application resource data structure to be compatible with updated front end resource data structure; and transmit a second control instruction to the first downstream entity network to modify the first entity resource data structure to be compatible with the updated front end resource data structure.

In some embodiments, or in combination with any of the previous embodiments, the invention is further configured to: determining the modification to the data associated with the first front end resource data structure comprises determining (i) addition of new data, (ii) removal of data, and/or (iii) alteration of data.

In some embodiments, or in combination with any of the previous embodiments, the invention is further configured to: determining the modification to the data associated with the first front end resource data structure comprises receiving, via the real-time interactive technology resource interface at the display device of the user device, a user request to update data associated with the first front end resource data structure.

In some embodiments, or in combination with any of the previous embodiments, the invention is further configured to: receive, via the real-time interactive technology resource interface at the display device of the user device, a user request to delete the first front end resource data structure; delete the first front end resource data structure; determine downstream transformations of the first front end resource data structure, comprising determining (i) the first device application resource data structure constructed by the user device resource application, and (ii) the first entity resource data structure constructed by the first downstream entity network; transmit a first control instruction to the user device resource application to delete the first device application resource data structure; and transmit a second control instruction to the first downstream entity network to delete the first entity resource data structure.

In some embodiments, or in combination with any of the previous embodiments, the invention is further configured to: receive, via the real-time interactive technology resource interface at the display device of the user device, a user request to delete the first front end resource data structure; delete the first front end resource data structure; determine downstream transformations of the first front end resource data structure, comprising determining (i) the first device application resource data structure constructed by the user device resource application, and (ii) the first entity resource data structure constructed by the first downstream entity network; in response to a user input via the real-time interactive technology resource interface at the display device of the user device, transmit a second control instruction to the first downstream entity network to delete the first entity resource data structure such that (i) the first entity resource data structure is uncoupled (such that the entity system/network associated with the third party entity is unable to access/utilize the first front end resource data structure via the first entity resource data structure) from the first device application resource data structure, and while (ii) the first device application resource data structure is structured to be utilized by the user device resource application.

In some embodiments, or in combination with any of the previous embodiments, the link between the first front end resource data structure and the first entity resource data structure is temporary. Here, the invention is further configured to: present, via the real-time interactive technology resource interface at the display device of the user device, a link check notification to the user; in response to a successful link response from the user, couple the first front end resource data structure and the first entity resource data structure; and present, via the real-time interactive technology resource interface at the display device of the user device, a confirmation of the coupling of the first front end resource data structure and the first entity resource data structure.

In some embodiments, or in combination with any of the previous embodiments, the link between the first front end resource data structure and the first entity resource data structure is temporary. Here, the invention is further configured to: present, via the real-time interactive technology resource interface at the display device of the user device, a link check notification to the user; in response to an unsuccessful link response from the user, initiate deletion of the first entity resource data structure at the first downstream entity network; and present, via the real-time interactive technology resource interface at the display device of the user device, a confirmation of the deletion the first entity resource data structure upon determining completion of the deletion of the first entity resource data structure at the first downstream entity network.

In some embodiments, or in combination with any of the previous embodiments, the real-time interactive technology resource interface is structured to present graphical interface objects associated with a second front end resource data structure, and associated downstream transformations comprising (i) a second device application resource data structure constructed by a user device resource application, and (ii) a second entity resource data structure constructed by a second downstream entity network of the one or more downstream entity networks. Here, the invention is further configured to: receive, via the real-time interactive technology resource interface at the display device of the user device, a user request to delete the second front end resource data structure; and initiate deletion of the second front end resource data structure, the second device application resource data structure, and/or the second entity resource data structure based on the user request, such that the first device application resource data structure is structured to be utilized by the user device resource application and the first entity resource data structure is structured to be utilized by the first downstream entity network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
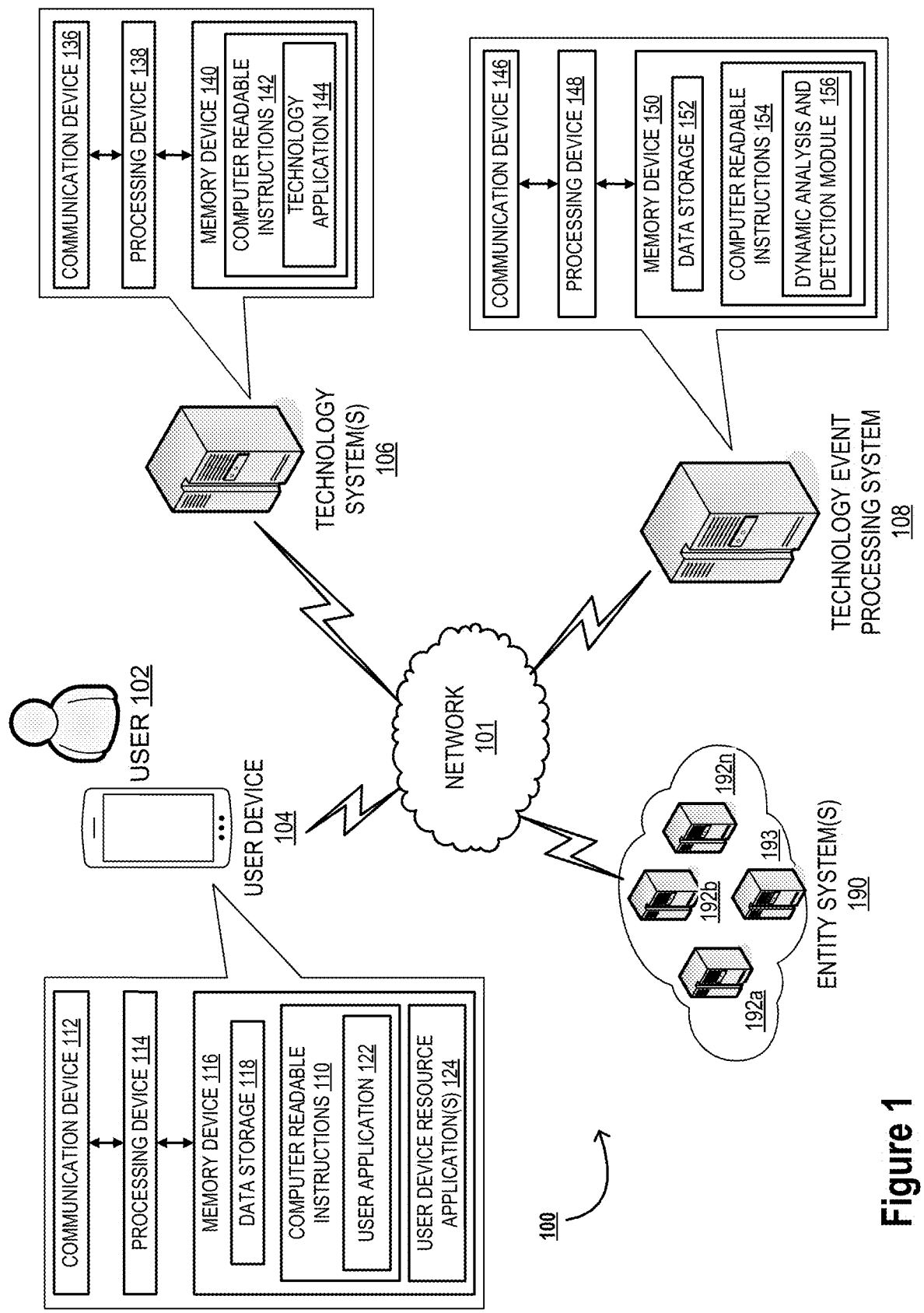
Figure 2:
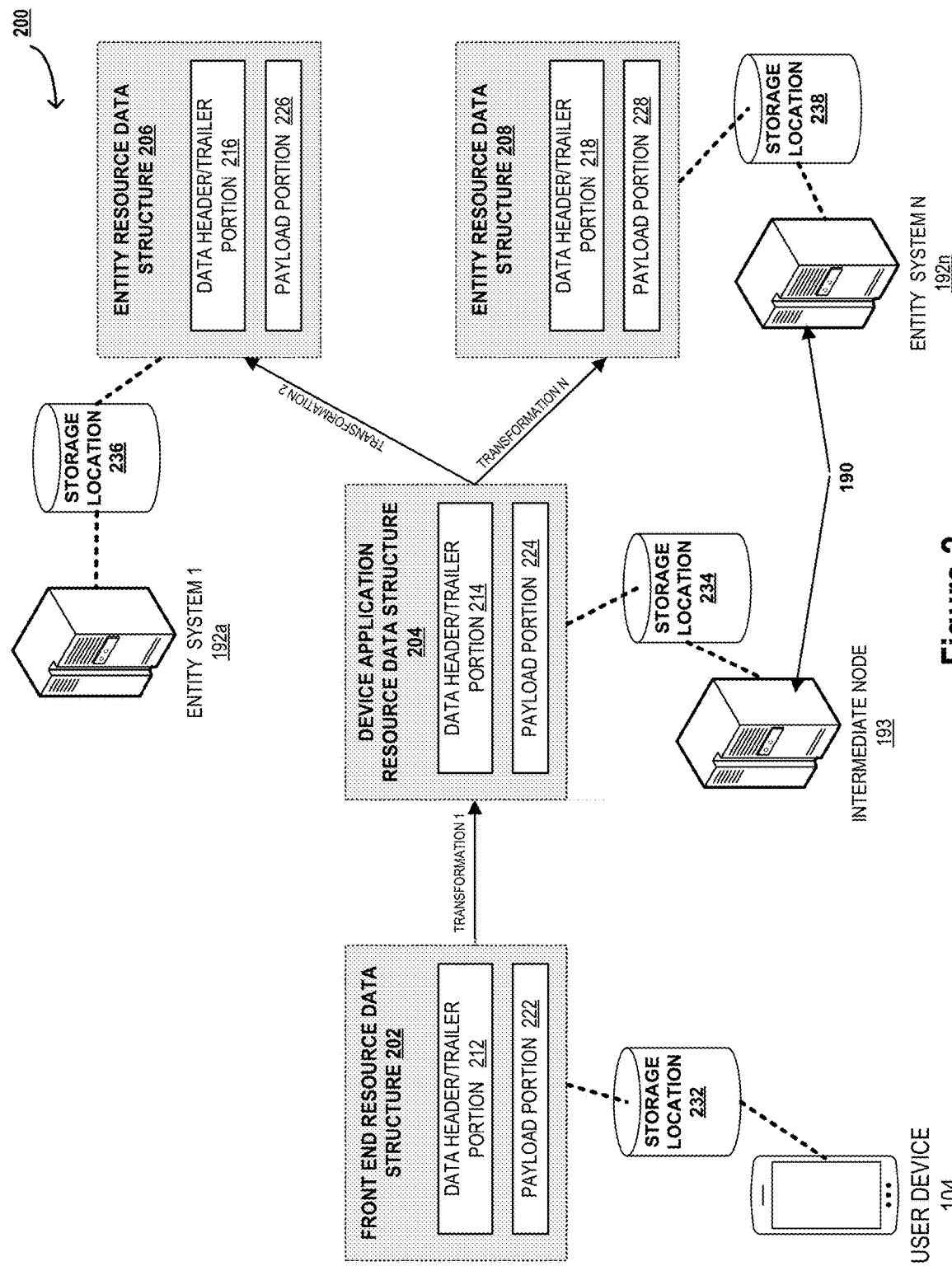
Figure 3:
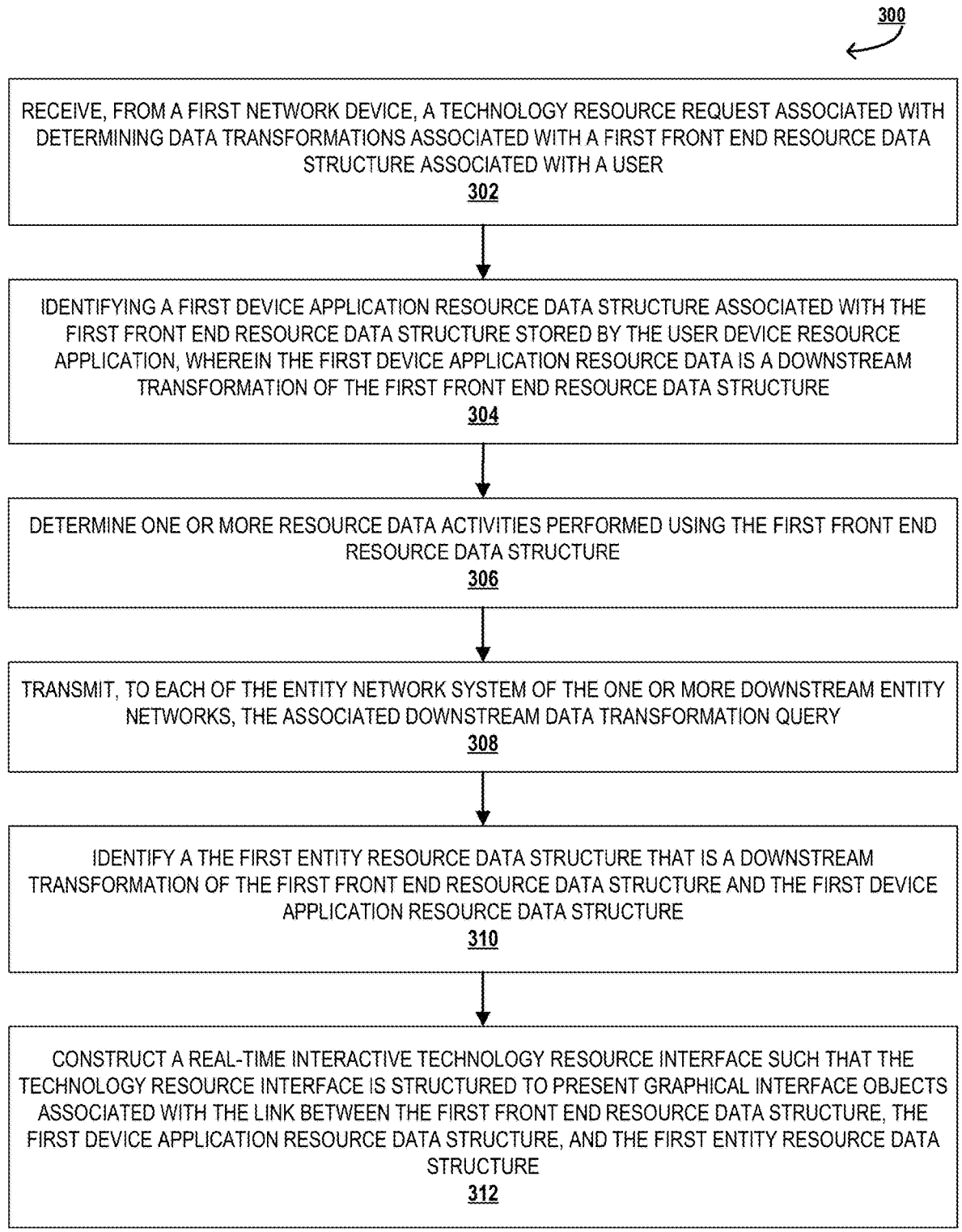
Figure 4A:
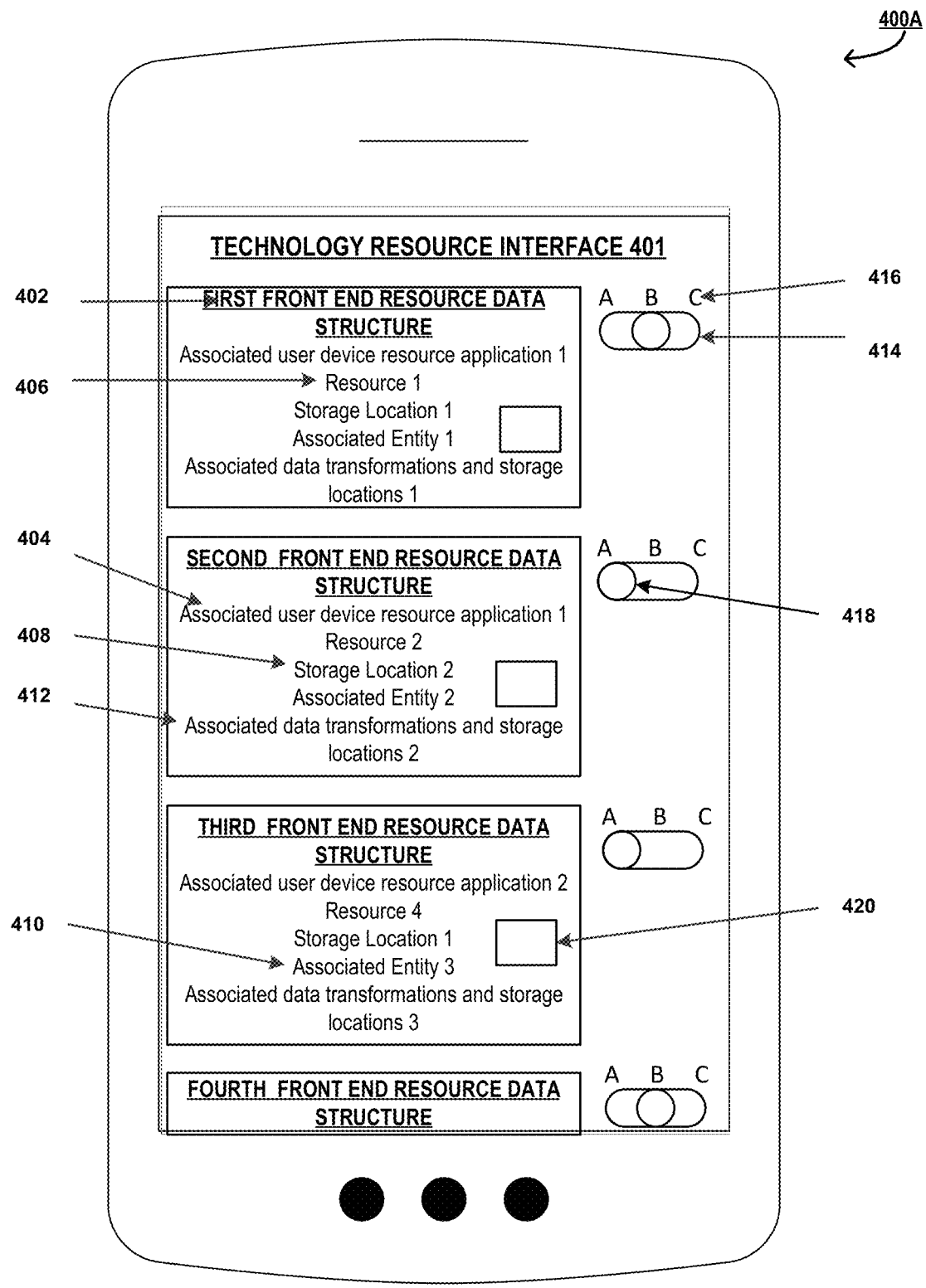
Figure 4B:
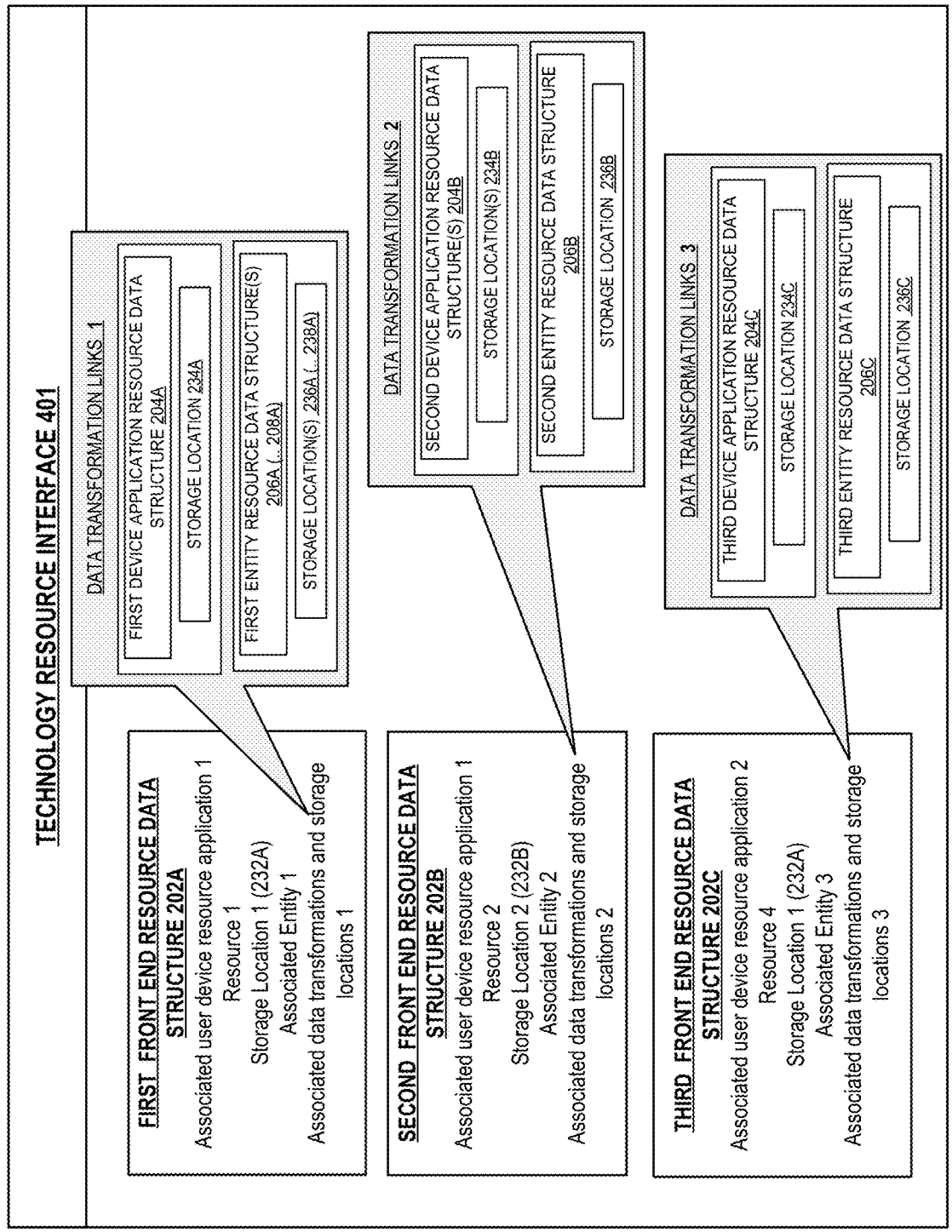

Having thus described embodiments of the invention in general terms, reference will now be made to the accompanying drawings, wherein:

FIG. 1 depicts a distributed system network environment 100 for dynamic linking of resource data structures across distributed networks, in accordance with one embodiment of the present invention;

FIG. 2 depicts a schematic depiction 200 of an illustrative example of data structure transformations and tracking across distributed networks, in accordance with one embodiment of the present invention;

FIG. 3 depicts a high-level process flow 300 for dynamic linking of resource data structures across distributed networks, in accordance with one embodiment of the present invention;

FIG. 4A depicts a schematic depiction 400A of an illustrative example of a real-time interactive technology resource interface 401, in accordance with one embodiment of the present invention; and FIG. 4B depicts a schematic depiction 400B of an illustrative example of a real-time interactive technology resource interface 401, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. In some embodiments, an entity may be merchant associated with providing products, goods, services, and/or the like to the users. As such, the entity may be any institution, group, association, financial institution, establishment, company, union, authority or the like, employing information technology resources. In some embodiments, the entity may be a financial institution which may include any financial institutions such as commercial banks, thrifts, federal and state savings banks, savings and loan associations, credit unions, investment companies, insurance companies and the like.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity. The technology or resource may be associated with a "resource instrument" or a "resource distribution device" which are structured to be used by the users to perform interactions or resource distribution requests. Examples of resource instruments may include, but are not limited to, a credit card, a debit card, or the like. As used herein, the term "interaction" or "resource distribution request" may refer to transactions performed by users of the entity using one or more resource distribution device towards purchase of products, goods, services, and/or the like As used herein, a "user interface" may be a graphical user interface. In some embodiments, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

An "electronic data file" or "technology event data file" or a "data file" often comprises multiple technology event records (for example, hundreds, thousands or tens of thousands of technology event records). Each technology event record may comprise multiple data elements or attributes containing electronic data regarding one or more aspects of an electronic/technology activity. In some instances, each technology event record may comprise technology elements associated with type of activity, instructions for processing the event record, technology resources involved, information associated with the users/entities/systems involved, technology platform applications involved, processing events associated with each technology application, activity attributes, time, location, person/system that initiated/performed the activity, and/or other aspects. Furthermore, the technology elements may by discrete components of the record, or the technology elements may merely refer to one or more portions of a single data component in a record. Although referred to as "a technology event record", it is understood that, in some embodiments each activity may be associated with multiple technology event records.

For example, in the instances where the electronic data files comprise financial information, each electronic data file may comprise multiple technology event records, with each technology event record being associated with an electronic activity comprising a financial activity/transaction. Furthermore, each record may comprise one or more technology elements associated with type of activity (for example, debit, credit, resource transfer), instructions for processing the record (for example, type of processing), technology resources involved (for example, initiating resource/financial institution, receiving resource or financial institution, intermediate resource systems, domestic systems, international systems), technology platforms applications involved (for example, technology data processing applications, regulatory applications, internal applications), information associated with the users/entities/systems involved (for example, initiating or first user name, first user account identifiers, receiving or second user name, second user account identifiers), activity attributes (for example, resource quantity/amount, inbound and outbound currency), timestamp, and/or other aspects.

An electronic activity, also referred to as a technology activity, such as a "resource transfer" or "transaction," may refer to any activities or communication between a user or entity and the financial institution, activities or communication between multiple entities, communication between technology applications and the like. A resource transfer may refer to a payment, processing of funds, purchase of goods or services, a return of goods or services, a payment transaction, a credit transaction, or other interactions involving a user's account. In the context of a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A resource transfer may include one or more of the following: renting, selling, and/or leasing goods and/or services (e.g., groceries, stamps, tickets, DVDs, vending machine items, and the like); making payments (e.g., paying monthly bills; paying federal, state, and/or local taxes; and the like); sending remittances such as paychecks; loading money onto stored value cards (SVCs) and/or prepaid cards; donating to charities; and/or the like.

Distributed network environments provide a variety of user technology resource components applications (e.g., front-end technology applications, client facing technology applications, web services, etc.) to users. However, this requires operative and compatible interaction between back-end technology resource components (e.g., back-end systems) and user technology resource components, because user applications typically require network data to be transmitted between the back-end technology resource components and front-end technology components. Here, the back-end technology resource components may be required to fetch current network data from other entity systems (e.g., third-party systems, vendor applications, etc.), e.g., through web services, Application programming interfaces (APIs), batch processes, etc. These systems involve high volume data processing requiring multiple back-end applications across various discrete technology platforms running in order to implement the processing stages of electronic data for user technology resource components applications. In some instances, this may involve processing of electronic data across multiple distributed discrete technology platforms that are currently used in the large scale processing of electronic files requires a myriad of processes for data transmission, data reformatting, and substantial transformation of technology activity data stored in the electronic files and records.

However, the technology resource components perpetually undergo transformations or iterations over time (e.g., monthly), e.g., due to production release cycles, for offering enhancements to the features, etc. However, these temporal transformations/iterations of the technology resource components may inherently cause the operative and compatible interaction and data transfers between back-end technology resource components (e.g., back-end systems) and user technology resource components to be redundant, thereby resulting in undesirable critical defects and inevitable backward compatibility issues. For instance, the temporal transformations/iterations of the technology resource components may cause the data retrieval and/or transmission from back-end technology resource components to be incorrect or different, and may require additional data parameters to be fetched back-end technology resource components differently. Typically, this requires the data being transferred between applications to be transformed or re-formatted multiple times as a part of the processing itself or to be conductive for processing by the subsequent technology application and processing platform. In this regard, the final transformed record data often does not resemble the initial data with respect to the associated format, programing language, syntax and/or attributes.

Typically, performing a particular technology activity (e.g., a resource transmission activity) requires operative and compatible interaction, and data transmission between a variety of systems and applications across various distributed networks (e.g., a user network, a source resource network, a credential network, a destination entity network, and/or the like). For instance, an activity initiated at a source node such as a front end or edge node at a first network may involve data from the source node to be transmitted to another destination/downstream node at another entity network, e.g., via one or more intermediary nodes such as systems and/or applications therebetween along the transmission path between the source node and the destination node. Each subsequent downstream node (e.g., one or more intermediary nodes, destination node at another entity network, and/or the like) may transform the received data (from the associated upstream node) at the node and store a copy of the transformed data thereon, before subsequently transmitting to the next downstream node along the path for a variety of reasons such as to ensure compatibility with downstream systems, due to existing network data protocols, for safety reasons, and/or the like. Transformation of data herein may refer to modification, alteration, tokenization, encoding, placeholder creation, and/or the like.

For instance, a user may input data associated with a first front end data structure at a source/front/edge node such as a user device at a first network. As a non-limiting example, the first front end data structure may be resource data associated with a resource instrument, such as a primary identifier or account number associated with the resource instrument. After the user inputs data associated with the first front end data structure at a source/front/edge node such as a user device, a user device resource application (either by itself, or at another entity system or separate network associated with the application provider) may transform the received data into a device application resource data structure. This transformed data, i.e., the device application resource data structure may be stored at the entity system or network associated with the application provider, at the user device, and/or the like. Continuing with the prior non-limiting example, a user device resource application such as a digital wallet or an entity system or network associated with the digital wallet provider may transform the first front end data structure having resource data associated with the resource instrument into a device application resource data structure, such as a tokenized transformation of the resource data associated with a device/application specific primary identifier or account number. Here, the user device resource application may subsequently utilize or transmit the transformed data, i.e., the device application resource data structure, in place of the first front end data structure, e.g., when the user seeks to perform an activity with the first front end data structure. However, by the very nature of the tokenized transformation, the user device resource application may be able to utilize or transmit the transformed data, i.e., the device application resource data structure or an unauthorized system may access/utilize this data, thereby indirectly utilize the user's resource data, without the knowledge or express permission of the user.

Moreover, for undertaking during the process of an activity, the user device resource application and/or the entity system or network associated with the application provider may transmit the device application resource data structure to another downstream system/network(s), which themselves may transform the device application resource data structure into one or more entity resource data structures and store them at one or more locations, such that the entity resource data structures may be used in place of the first front end data structure, and/or the device application resource data structure. Continuing with the prior non-limiting example, when a user performs an interaction (e.g., a purchase) with a third party entity that requires use of the first front end data structure via the user device resource application such as a digital wallet, the user device resource application (either by itself, or at another entity system or separate network associated with the application provider) may transmit the tokenized transformation, i.e., the device application resource data structure to the entity system/network associated with the third party entity. The entity system/network associated with the third party entity may then perform a tokenized transformation of the device application resource data structure into an entity resource data structure (e.g., associated with the third-party entity specific primary identifier or account number) and store them. Again, by the very nature of the tokenized transformation, the entity system/network associated with the third party entity may be able to utilize or transmit the transformed data, i.e., the entity resource data structure or an unauthorized system may access/utilize this data, thereby indirectly utilize the user's resource data, without the knowledge or express permission of the user.

However, the user whose data was initially transmitted data from the source node typically has no means of ensuring the data security and safety of the numerous downstream transformations that are stored at a variety of systems, that are completely opaque to the user. As such unauthorized copies of the user' data, albeit in transformed forms, may be stored on various systems and could be susceptible for unauthorized use in activities unbeknownst to the user. The innate nature of transformations and modifications, and the fact that the transformed data is different from the upstream data, make them arduous to track. Moreover, the enormous volumes of data being continuously generated exacerbates the issue. This inability of conventional systems to identify iterations of data transformations further causes problems with data deletion and compatibility. First, even when the initially transmitted data from the source node is deleted at the source node, copies of the transformed data may still be stored at and used by other systems associated with prior transmissions. Second, initially transmitted data from the source node is updated at the source node, copies of the transformed data would not comprise updated data and may cause failure of activities due to compatibility issues. Accordingly, a need exists for dynamic linking of resource data structures across distributed networks.

As discussed previously, embodiments of the present invention alleviate the deficiencies of existing systems and achieve other advantages by providing apparatuses (e.g., a system, computer program product and/or other devices) and methods for dynamic linking of resource data structures across distributed networks. Furthermore, the present invention is structured for enhancing data security by evaluating and determining iterations of data transformations associated with resource data structures across networks and establishing deletion and usage modification mechanisms for stored unauthorized downstream iterations.

FIG. 1 illustrates a distributed system network environment 100 for dynamic linking of resource data structures across distributed networks, in accordance with one embodiment of the present invention. As illustrated in FIG. 1, a technology event processing system 108 is operatively coupled, via a network 101 to a user device 104, to technology system(s) 106, and to entity system(s) 190 (e.g., intermediate node(s) 193, entity system 1 192*a*, entity system 2 192*b*, . . . , entity system N 192*n*, and/or the like that may be associated with one or more separate distributed networks). In this way, the technology event processing system 108 can send information to and receive information from the user device 104, the technology system(s) 106 and the entity system(s) 190. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the dynamic analysis and detection module 156 of the technology event processing system 108, a network of technology platform applications, is configured for validating, determining and evaluating temporal data transformations associated with technology resource components across iterations of technology applications.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals accessing user technology resource components applications (e.g., front-end technology applications, client facing technology applications, web services, etc.). As such, in some embodiments, the user 102 may be associated with a financial institution.

FIG. 1 also illustrates a user system 104, e.g., associated with a first distributed network. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the technology system(s) 106, the technology event processing system 108, etc. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the technology event processing system 108 and/or the technology system(s) 106 are configured to cause the processing device 114 to execute the computer readable instructions 110, thereby causing the user device 104 to perform one or more functions described herein, for example, via the user application 122 and the associated user interface (e.g., technology resource interfaces 401 illustrated by FIGS. 4A-4B). The user device 104 may further comprise a user device resource application 124, such as an entity application (e.g., a digital wallet) associated with an entity system or network (e.g., one or more of the) associated with the digital wallet provider.

As further illustrated in FIG. 1, the technology event processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs and technology platform applications based on computer-readable instructions thereof, which may be stored in a memory device, for example, executing computer readable instructions 154 or computer-readable program code 154 stored in memory device 150 to perform one or more functions associated with a dynamic analysis and detection module 156.

The processing device 148 is operatively coupled to the communication device 146 and the memory device 150. The processing device 148 uses the communication device 146 to communicate with the network 101 and other devices on the network 101, such as, but not limited to the technology system(s) 106, the entity system(s) 190 and the user system 104. As such, the communication device 146 generally comprises a modem, server, or other device for communicating with other devices on the network 101.

As further illustrated in FIG. 1, the technology event processing system 108 comprises the computer-readable instructions 154 stored in the memory device 150, which in one embodiment includes the computer-readable instructions 154 of the dynamic analysis and detection module 156. In some embodiments, the memory device 150 includes data storage 152 for storing data related to the system environment, but not limited to data created and/or used by the dynamic analysis and detection module 156. The dynamic analysis and detection module 156 is further configured to perform or cause other systems and devices to perform the various steps described herein on.

As such, the processing device 148 is configured to perform some or all of the dynamic analysis and detection steps described throughout this disclosure, for example, by executing the computer readable instructions 154. In this regard, the processing device 148 may perform one or more steps singularly and/or transmit control instructions that are configured to cause the dynamic analysis and detection module 156, technology system(s) 106, user device 104, and entity system(s) 190 and/or other systems and applications, to perform one or more steps described throughout this disclosure. Although various data processing steps may be described as being performed by the dynamic analysis and detection module 156, it is understood that the processing device 148 is configured to establish operative communication channels with and/or between these modules and applications, and transmit control instructions to them, via the established channels, to cause these module and applications to perform these steps. In one embodiment of the invention, the technology event processing system 108 is operated by a financial institution. In some embodiments, the technology system(s) 106 may be part of the technology event processing system 108. Similarly, in some embodiments, the technology event processing system 108 is part of the technology system(s) 106. In other embodiments, the technology system(s) 106 are distinct from the technology event processing system 108.

In one embodiment of the technology event processing system 108, the memory device 150 stores, but is not limited to, the dynamic analysis and detection module 156. In one embodiment of the invention, the dynamic analysis and detection module 156 may have computer-executable program code that instructs the processing device 148 to operate the network communication device 146 to perform certain functions involving the entity system(s) 190, the user device 104 and/or the technology system(s) 106, as described herein. In one embodiment, the computer-executable program code of an application associated with the dynamic analysis and detection module 156 may also instruct the processing device 148 to perform certain logic, data processing, and data storing functions of the application. The processing device 148 is configured to use the communication device 146 to receive data, transmit processed data and the like.

In the embodiment illustrated in FIG. 1 and described throughout much of this specification, the dynamic analysis and detection module 156 may perform one or more of the functions described herein, by the processing device 148 executing computer readable instructions 154 and/or executing computer readable instructions associated with one or more technology platform applications.

The entity system(s) 190 may include multiple systems, servers, computers or the like maintained by one or many entities. As a non-limiting example, the FIG. 1 merely illustrates one of those entity system(s) 190 that, typically, interacts with many other similar systems to form the distributed information networks. For instance, the entity systems 190 may comprise (i) one or more intermediate node(s) 193 (e.g. associated with one or more second distributed networks), and (i) entity system 1 192a (e.g., associated with a third distributed network), entity system 2 192b (e.g., associated with a fourth distributed network), . . . , entity system N 192n (e.g., associated with a Mth distributed network). As a non-limiting example, the one or more intermediate node(s) 193 may be associated with entity system or separate network associated with the application provider of user device resource application 124. As a non-limiting example, the entity system 1 192a may be associated with a downstream first third party entity system. As a non-limiting example, the entity system N 192n may be associated with a downstream Kth third party entity system.

As illustrated in FIG. 1, the technology system(s) 106 is connected to the technology event processing system 108 and may be associated with a financial institution network. In this way, while only one technology system(s) 106 is illustrated in FIG. 1, it is understood that multiple network systems may make up the system environment 100 and be connected to the network 101. The technology system(s) 106 generally comprises a communication device 136, a processing device 138, and a memory device 140. The technology system(s) 106 comprises computer-readable instructions 142 stored in the memory device 140, which in one embodiment includes the computer-readable instructions 142 of a technology application 144. The technology system(s) 106 may communicate with the technology event processing system 108. The technology event processing system 108 may communicate with the technology system(s) 106 via a secure connection generated for secure encrypted communications between the two systems for communicating data for processing across various applications.

As further illustrated in FIG. 1, in some embodiments, the technology event processing system environment 100 further comprises entity system(s) 190, in operative communication with the technology event processing system 108, the technology system(s) 106, and/or the user device 104. Typically, the entity system(s) 190 comprises a communication device, a processing device and memory device with computer readable instructions. In some instances, the entity system(s) 190 comprises one or more third-party systems, vendor applications, etc. These applications may be operated by the processor executing the computer readable instructions associated with the entity system(s) 190, as described previously. In some instances, the entity system(s) 190 is owned, operated or otherwise associated with third party entities, while in other instances, the entity system(s) 190 is operated by the entity associated with the systems 108 and/or 106. Although a single external entity system(s) 190 is illustrated, it should be understood that the entity system(s) 190 may represent multiple technology servers or entity systems 192a, . . . , 192n, 193, etc. operating in sequentially or in tandem to perform one or more data processing operations, as illustrated by FIG. 2.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a schematic depiction 200 of an illustrative example of data structure transformations and tracking across distributed networks, in accordance with one embodiment of the present invention.

As illustrated by FIG. 2, a first front end resource data structure 202 may be stored at a storage location 232 (e.g., associated with user device 104). The first front end resource data structure 202 may comprise a data header and trailer portion 212, and a payload portion 222 (e.g., comprising resource identifier information associated with a resource instrument, such as a primary identifier or account number associated with the resource instrument). As used herein, data header may refer to data associated for preparing the end device for further data, e.g., the payload data, while the data trailer may refer to data added at the end of the payload. For instance, a user may input data associated with a first front end data structure 202 at a source/front/edge node such as a user device 104 at a first network. As a non-limiting example, the first front end data structure 202 may be resource data associated with a resource instrument, such as a primary identifier or account number associated with the resource instrument.

The first front end resource data structure 202 may be transmitted to an intermediate node 193 (e.g., associated with or operating the user device resource application 124), where it may undergo a first transformation into a first device application resource data structure 204, which may be stored at a storage location 234. After the user inputs data associated with the first front end data structure 202 at a source/front/edge node such as a user device 104, another entity system, i.e., the intermediate node 193 associated with the user device resource application 124 may transform the received data into a device application resource data structure 204. The first device application resource data structure 204 may comprise a data header trailer portion 214, and a payload portion 224 (e.g., comprising application tokenized resource identifier information). Continuing with the prior non-limiting example, the intermediate node 193 (e.g., associated with or operating the user device resource application 124 such as a digital wallet) may transform the first front end data structure 202 having resource data associated with the resource instrument into a device application resource data structure 204, such as a tokenized transformation of the resource data associated with a device/application specific primary identifier or account number. As a non-limiting example, for the transformation, the payload portion 222 may be extracted from the from end resource data structure 202, and encoded/encrypted/tokenized or otherwise transformed into the payload portion 224, and a data header and data trailer 214 may then be appended to the payload portion 224. This transformed data, i.e., the device application resource data structure may be stored at the entity system or network associated with the application provider, at the storage location 234, and/or the like. Here, the user device resource application 124 may subsequently utilize or transmit the transformed data, i.e., the device application resource data structure 204, in place of the first front end data structure 202, e.g., when the user seeks to perform an activity with the first front end data structure 202.

Moreover, for undertaking during the process of an activity, the user device resource application and/or the entity system or network associated with the application provider may transmit the device application resource data structure to another downstream system/network(s), which themselves may transform the device application resource data structure into one or more entity resource data structures and store them at one or more locations, such that the entity resource data structures may be used in place of the first front end data structure, and/or the device application resource data structure. Here, the first device application resource data structure 204 may then be transmitted to a first entity system 192a (e.g., a third-party system of a first distributed network), where it may undergo a second transformation into a first entity resource data structure 206, which may be stored at a storage location 236. Continuing with the prior non-limiting example, when a user performs an interaction (e.g., a purchase) with a third party entity that requires use of the first front end data structure via the user device resource application such as a digital wallet, the user device resource application (either by itself, or at another entity system or separate network associated with the application provider) may transmit the tokenized transformation, i.e., the device application resource data structure to the entity system/network associated with the third party entity.

The first entity system 192a or first entity system/network 192a associated with the first third party entity may then perform a tokenized transformation of the device application resource data structure 204 into the first entity resource data structure 206 (e.g., associated with the first third-party entity specific primary identifier or account number) and store it at storage location 236. The first entity resource data structure 206 may comprise a data header trailer portion 216, and a payload portion 226 (e.g., comprising entity tokenized resource identifier information). As a non-limiting example, for the transformation, the payload portion 224 may be extracted from the device application resource data structure 204, and encoded/encrypted/tokenized or otherwise transformed into the payload portion 226, and a data header and data trailer 216 may then be appended to the payload portion 226. This transformed data, i.e., the first entity resource data structure 206 may be stored at storage location 236.

Moreover, the first device application resource data structure 204 may also be transmitted to other entity systems, such as a second/Nth entity system 192n (e.g., a third-party system of a second distributed network), where it may undergo another (e.g., third) transformation into a second entity resource data structure 208, which may be stored at a storage location 238. The second entity resource data structure 208 may comprise a data header trailer portion 218, and a payload portion 228 (e.g., comprising another entity tokenized resource identifier information). As a non-limiting example, for the transformation, the payload portion 224 may be extracted from the device application resource data structure 204, and encoded/encrypted/tokenized or otherwise transformed into the payload portion 228, and a data header and data trailer 218 may then be appended to the payload portion 228. This transformed data, i.e., the Nth or third entity resource data structure 208 may be stored at storage location 238. Again, by the very nature of the tokenized transformation, the entity system/network associated with the third party entity may be able to utilize or transmit the transformed data, i.e., the entity resource data structure or an unauthorized system may access/utilize this data, thereby indirectly utilize the user's resource data, without the knowledge or express permission of the user.

However, the user whose data was initially transmitted data from the source node typically has no means of ensuring the data security and safety of the numerous downstream transformations that are stored at a variety of systems, that are completely opaque to the user. As such unauthorized copies of the user' data, albeit in transformed forms, may be stored on various systems and could be susceptible for unauthorized use in activities unbeknownst to the user. The innate nature of transformations and modifications, and the fact that the transformed data is different from the upstream data, make them arduous to track. Moreover, the enormous volumes of data being continuously generated exacerbates the issue. This inability of conventional systems to identify iterations of data transformations further causes problems with data deletion and compatibility. First, even when the initially transmitted data from the source node is deleted at the source node, copies of the transformed data may still be stored at and used by other systems associated with prior transmissions. Second, initially transmitted data from the source node is updated at the source node, copies of the transformed data would not comprise updated data and may cause failure of activities due to compatibility issues. Accordingly, a need exists for dynamic linking of resource data structures across distributed networks.

FIG. 3 illustrates a high-level process flow 300 for dynamic linking of resource data structures across distributed networks in a distributed system network, in accordance with one embodiment of the present invention. As discussed previously, the invention is configured for enhancing data security by evaluating and determining iterations of data transformations associated with resource data structures across networks and establishing deletion and usage modification mechanisms for stored unauthorized downstream iterations. FIG. 4A depicts a schematic depiction 400A of an illustrative example of a real-time interactive technology resource interface 401, in accordance with one embodiment of the present invention. FIG. 4B depicts a schematic depiction 400B of an illustrative example of a real-time interactive technology resource interface 401, in accordance with one embodiment of the present invention. The process flow 300 of FIG. 3 will be described in conjunction with the interfaces 401 of FIGS. 4A-4B, herein.

As illustrated by block 302, in some embodiments, the system may receive, from a first network device (e.g., user device 104), a technology resource request associated with determining data transformations associated with a first front end resource data structure 202 associated with a user 102. Here, the user may submit a request or an input seeking to determine whether data transformations of a first front end resource data structure 202 of the user exist at other networks or systems, e.g., unbeknownst to the user. The user may provide this request via the interface 401 of the user application 122 at the user device 104.

In some embodiments, to begin the process of tracking any transformations of the first front end resource data structure 202, the system may analyze application data associated with applications of the user device 104 to determine whether the data associated with the first front end resource data structure 202 was provided to any of the applications by the user, or was available to any of the applications. Alternatively or in addition to the foregoing, the system may determine one or more resource data activities performed using the first front end resource data structure 202, in order to determine the associated applications. Here, the system may determine a user device resource application 124 stored on the user device 104 where the user 102 has previously input data associated with the first front end resource data structure 202. The system may analyze the user device resource application 124 to determine whether the user device resource application 124 has created (or has access to) a data transformation associated with the first front end resource data structure 202.

Next at block 304, the system may identify a first device application resource data structure 204 associated with the first front end resource data structure 202 stored by the user device resource application 124. As noted previously, the first device application resource data is a downstream transformation of the first front end resource data structure 202 (and an upstream transformation of the first entity resource data structure 206 described later on). The system may then determine where the first device application resource data structure 204 is stored (e.g., storage location 234 of intermediate node 193), and extract respective data therefrom and augment the interface 401 therewith. Accordingly, the system identifies a first tier/device tier or a first layer/device layer of the transformed data.

The system may then proceed to identify and track subsequent downstream transformations of a second tier/entity tier or a second layer/entity layer. As illustrated by block 306, in some embodiments, the system may determine one or more resource data activities performed using the first front end resource data structure 202, e.g., based on activities of the user device resource application 124 via the first device application resource data structure 204.

Here, in some embodiments, the system may extract data associated with activities (e.g., historical activities) performed using the resource or resource instrument of the first front end resource data structure 202. However, the system may not merely parse through all of the activity data. Here, in order to improve processing efficiency, the system intelligently truncates the activity data, thereby further reducing the memory resource required. The system may determine a creation time associated with the first device application resource data structure 204 by the user device resource application 124. The system may determine an activity log associated with the first entity resource data structure 206. The system may truncate the activity log based on the creation time associated with the first device application resource data structure 204 such that the truncated activity log comprises the one or more resource data activities performed after the creation time (e.g., using the first front end resource data structure 202) and discards any activity data associated with a time prior to the creation time. In some embodiments, to further provide a reduction in memory resource required, the system may only fetch the activity data that follows the creation time, and does not fetch activity data preceding the creation time.

In some embodiments, determining one or more resource data activities performed using the first front end resource data structure 202 further comprises determining activities performed by the user device resource application 124 using the first device application resource data structure 204. In other words, the system may determine activities performed by the user device resource application 124 using the first device application resource data structure 204, e.g., by analyzing application data associated with the user device resource application.

Next, the system may determine, for each of the one or more resource data activities, an associated downstream entity network that was a recipient of data associated with the first front end resource data structure 202. In other words, for every activity that involved the first tier/device tier or a first layer/device layer transformation, i.e., the first device application resource data structure 204, the system determines the associated downstream entity or network that likely was a recipient of the first device application resource data structure 204 during the course of the activity. In some embodiments, determining, for each of the one or more resource data activities, the associated downstream entity network, further comprises tracking resource data transmissions associated with the one or more resource data activities. Here, the system may analyze the data logs, data structures, metadata and/or the like.

The system may then construct a downstream data transformation query for an entity network system (192a, . . . , 192n) of each of the one or more downstream entity networks that were determined to be likely downstream recipients of the first device application resource data structure 204. Here, the downstream data transformation query is structured to trigger the respective entity network system to provide a response regarding whether the respective entity network system has created a data transformation associated with the first device application resource data structure 204 (thereby a transformation of the first front end resource data structure 202). Here, the system may structure the data transformation query to be compatible with the technology, security, and compatibility requirements of each respective entity network system. Next at block 308, the system may transmit, to each of the entity network system (192a, . . . , 192n) of the one or more downstream entity networks, the associated downstream data transformation query.

As illustrated by block 310, in some embodiments, the system may analyze the responses from the entity network system (192a, . . . , 192n) of each of the one or more downstream entity networks, to identify a first entity resource data structure 206 is a downstream transformation of the first front end resource data structure 202. Here, the system may receive, from a first entity network system 192a of a first downstream entity network of the one or more downstream entity networks, a first entity response indicating that a first entity resource data structure 206 associated with the first front end resource data structure 202 was created by the first downstream entity network. The system may then determine where the first entity resource data structure 206 is stored (e.g., storage location 236 of entity system 1 192a), and extract respective data therefrom and augment the interface 401 therewith. Accordingly, the system identifies a second tier/entity tier or a second layer/entity layer of the transformed data.

The system may link (i) the first front end resource data structure 202 and the first device application resource data structure 204, and (ii) the first device application resource data structure 204 and the first entity resource data structure 206. Here, the system may then link the first front end resource data structure 202 and the first entity resource data structure 206. In some embodiments these links are temporary, until a positive user confirmation is received. Here, the system may present, via the real-time interactive technology resource interface 401 at the display device of the user device, a link check notification to the user. In response to a successful link response from the user, the system may couple the first front end resource data structure 202 and the first entity resource data structure 206. The system may present, via the real-time interactive technology resource interface 401 at the display device of the user device, a confirmation of the coupling of the first front end resource data structure 202 and the first entity resource data structure 206.

Alternatively, in response to an unsuccessful link response from the user, the system may initiate deletion of the first entity resource data structure 206 at the first downstream entity network, and present, via the real-time interactive technology resource interface 401 at the display device of the user device, a confirmation of the deletion the first entity resource data structure 206 upon determining completion of the deletion of the first entity resource data structure 206 at the first downstream entity network.

Next at block 312, the system may construct a real-time interactive technology resource interface 401 such that the technology resource interface is structured to present graphical interface objects associated with the links between the first front end resource data structure 202, first device application resource data structure 204 and the first entity resource data structure 206. Here, the system may construct the real-time interactive technology resource interface 401 such that the technology resource interface is structured to present graphical interface objects associated with the links between the first front end resource data structure 202, the first device application resource data, and the first entity resource data structure 206.

The system may then initiate presentation, via a display device of a user device associated with the user 102, of the real-time interactive technology resource interface 401. The real-time interactive technology resource interface 401 is structured to present graphical interface objects associated with (i) the first front end resource data structure 202, and its downstream transformations: (i) the first device application resource data structure 204, and (iii) the first entity resource data structure 206. The real-time interactive technology resource interface 401 is structured to present graphical interface objects associated with other front end data structures as well, such as a second front end resource data structure, and associated downstream transformations comprising (i) a second device application resource data structure constructed by a user device resource application 124, and (iii) a second entity resource data structure constructed by a second downstream entity network of the one or more downstream entity networks.

In some embodiments, the system allows for dynamic updating of the data structure across the interactions of the transformations. The system may determine a modification to the data associated with the first front end resource data structure 202. Here, in some embodiments, determining the modification to the data associated with the first front end resource data structure 202 comprises determining (i) addition of new data, (ii) removal of data, and/or (iii) alteration of data. In some embodiments, determining the modification to the data associated with the first front end resource data structure 202 comprises receiving, via the real-time interactive technology resource interface 401 at the display device of the user device, a user request to update data associated with the first front end resource data structure 202. The system may update the data associated with the first front end resource data structure 202 to create an updated front end resource data structure.

The system may determine redundant data associated with downstream transformations of the first front end resource data structure 202, comprising determining (i) the first device application resource data structure 204 constructed by the user device resource application 124, and (ii) the first entity resource data structure 206 constructed by the first downstream entity network. The system may transmit a first control instruction to the user device resource application 124 to modify the first device application resource data structure 204 to be compatible with updated front end resource data structure. The system may transmit a second control instruction to the first downstream entity network to modify the first entity resource data structure 206 to be compatible with the updated front end resource data structure.

In some embodiments, the system allows for global dynamic deletion or expunging of the data structure across the interactions of the transformations. The system may receive, via the real-time interactive technology resource interface 401 at the display device of the user device, a user request to delete the first front end resource data structure 202. The system may delete the first front end resource data structure 202. The system may determine downstream transformations of the first front end resource data structure 202, comprising determining (i) the first device application resource data structure 204 constructed by the user device resource application 124, and (ii) the first entity resource data structure 206 constructed by the first downstream entity network. The system may transmit a first control instruction to the user device resource application 124 to delete the first device application resource data structure 204. The system may transmit a second control instruction to the first downstream entity network to delete the first entity resource data structure 206. The system is structured to allow the user to delete a portion of the downstream transformations, while retaining others. In this manner, the system allows for dynamic and secure customization by the user.

In some embodiments, the system allows for selective dynamic deletion of the data structure across the interactions of the transformations. The system may receive, via the real-time interactive technology resource interface 401 at the display device of the user device, a user request to delete the first front end resource data structure 202. The system may delete the first front end resource data structure 202. The system may determine downstream transformations of the first front end resource data structure 202, comprising determining (i) the first device application resource data structure 204 constructed by the user device resource application 124, and (ii) the first entity resource data structure 206 constructed by the first downstream entity network. The system may in response to a user input via the real-time interactive technology resource interface 401 at the display device of the user device, transmit a second control instruction to the first downstream entity network to delete the first entity resource data structure 206 such that (i) the first entity resource data structure 206 is uncoupled from the first device application resource data structure 204, and while (ii)

the first device application resource data structure 204 is structured to be utilized by the user device resource application 124.

In some embodiments, the system may receive, via the real-time interactive technology resource interface 401 at the display device of the user device, a user request to delete the second front end resource data structure. The system may initiate deletion of the second front end resource data structure, the second device application resource data structure, and/or the second entity resource data structure 206 based on the user request, such that the first device application resource data structure 204 is structured to be utilized by the user device resource application 124 and the first entity resource data structure 206 is structured to be utilized by the first downstream entity network.

FIGS. 4A and 4B a real-time interactive technology resource interface 401 on the integrated interface according to one embodiment of the invention. The real-time interactive technology resource interface 401 is typically displayed on the user device 104 described previously. The real-time interactive technology resource interface 401 is configured to display the front end resource data structures 202 along with relevant characteristics of the front end resource data structures 202 and is configured to enable the user to perform one or more functions associated with the front end resource data structures. In this regard, in some embodiments, the system may automatically determine one or more front end resource data structures and associated characteristics based on retrieving information from one or more user devices, analyzing transaction history of the user, retrieving resource/account activity, analyzing activity history received from entities and the like. For example, the system may extract front end resource data structure information stored on one or more user devices, remote storage locations and the like based on receiving requisite access permissions and credentials from the user and/or the associated entities. In this regard the system may communicate with and/or establish operative communication channels between one or more user devices, the cloud storage and remote servers associated with entities and other third party systems to access, retrieve and/or modify front end resource data structure information.

As another example, the system may analyze either the user's or an entity's transaction history to determine that the user utilized a first front end resource data structure associated with a first financial institution to execute a transaction with a first entity from an auxiliary user device (for example, a user device different from the device used to display the integrated interface). Continuing with the example, the system may determine that the first front end resource data structure is stored on the auxiliary device and establish an operative communication channel with the auxiliary device to extract relevant information comprising the token identifiers, one—time pass code generation key and the like. The system may further analyze the transaction history and determine that the user shared the first front end resource data structure with an indirect user (for example, a relative of the user) or that the indirect user utilized the first front end resource data structure for a transaction with another entity. In some embodiments the user may provide at least a portion of the information associated with the front end resource data structures via a user device and/or the integrated interface. In some embodiments, the system determines the token identifiers associated with the front end resource data structure and utilizes the token identifiers to perform one or more functions. In other embodiments, the system may be owned by a financial institution and the financial institution may correlate the token identifiers to one or more financial institution accounts by querying a token account database. In some embodiments, the system may extract information associated with the front end resource data structures from one or more locations for display on the integrated interface, in real time, based on receiving a request from the user or automatically in response to trigger events.

The system may then determine one or more user device resource applications 124 (e.g., digital wallets) associated with the each of the one or more front end resource data structures. In some embodiments, the system may determine the one or more user device resource applications 124 associated with each front end resource data structure based on the type of token identifier, information from user devices, activity history, third party databases and the like. In some embodiments, the user may associate one or more of the determined front end resource data structures with appropriate user device resource applications 124 and the system may verify the association before displaying the association on the integrated interface and performing transactions. In some embodiments, information associated with the user device resource applications 124, for example authorization credentials, wallet identifiers and the like may be requested from the user at least for a first time, typically prior to execution of transactions. In some embodiments, the system determines usage limits, parameters and rules associated with the one or more front end resource data structures and the one or more associated user device resource applications 124. In some embodiments, the system presents an integrated interface on a user device by extracting information associated with the user device resource applications 124 and their front end resource data structures from their individual locations and presenting the front end resource data structures on a single interface.

In some embodiments, the system may display graphical interface objects (e.g., 402 to 420) associated with the one or more front end resource data structures 202 on the real-time interactive technology resource interface 401 along with one or more characteristics of the front end resource data structure as shown in real-time interactive technology resource interface 401 of FIGS. 4A-4B. For example, each front end resource data structure 202 may comprise a panel 401 with the characteristics of the front end resource data structure and relevant information displayed within the panel 401. The front end resource data structure 402 may be established by an entity, comprising the token identifiers, alphanumeric strings identifying the token, titles/labels, pictorial attributes, images, icons or any other suitable means for the user to uniquely identify/recognize the payment identifier. In some embodiments the front end resource data structure 202 may be accompanied by one or more front end resource data structure characteristics comprising associated user device resource application 404, resource/account 406 directed to the front end resource data structure 202, storage location 408, entities 410 associated with the front end resource data structure 202, information about identified data transformations 412 across distributed networks and the like.

In some embodiments, the real-time interactive technology resource interface 401 comprises associated financial institution and/or user device resource application 124 (404) for the one or more front end resource data structures. For example, the system may determine that a second front end resource data structure is directed to an account or a payment instrument associated with the first financial institution. The system may further determine that the second front end resource data structure is associated with a first wallet owned/operated by the first financial institution or another entity. In this regard the system may display the name, title, user defined label, pictures, icons or other identifiers directed to the financial institution and the wallet associated with the front end resource data structure. In some embodiments the dashboard comprises financial institution accounts 406 associated with the wallet. In this regard, the financial institution account 406 may comprise the type of account (for example: savings account, checking account and the like) or financial instrument (for example: credit card, debit card and the like) that the front end resource data structure is directed to. In some embodiments, the financial institution account 406 may comprise alphanumeric titles, labels, images, either provided by the user or determined by the system to enable the identification the financial institution account. Typically, to maintain the security of the financial account information, the financial account information 406 is displayed without the actual account numbers, routing numbers, credit card numbers and other identifiers. However, these account identifiers may be displayed to the user in some embodiments, with or without additional authentication of the user. In some embodiments the dashboard displays one or more locations 408 where the front end resource data structure is stored. The system may determine the one or more locations 408 comprising cloud storage, remote server, memory device associated with one or more user devices, secure elements or integrated circuit chips associated with one or more user devices and the like. In this regard system may also display the entity that owns and/or operates the storage location and the type or name of user device in the instances where the front end resource data structure is stored on one or more user devices. In some embodiments the storage location 408 is the location from which the system extracted the information associated with the front end resource data structure. In some embodiments the storage location 408 may indicate that the front end resource data structure is directed to an online wallet associated with an online merchant.

In some embodiments the interface may comprise one or more entities 410 associated with the front end resource data structure 402. In some embodiments, the entity 410 may one or more entities that the user designated/assigned the token to be used in transactions with. For example, the user may designate a particular front end resource data structure for automatic recurring payments directed to a merchant or another financial account. In some embodiments, the entity 410 may be the entity that owns the wallet (for example, a third party entity) and/or the entity that created/governs the operation of the token (for example, an issuing financial institution). In some embodiments the entity 410 may indicate whether the front end resource data structure is assigned to be used for in-store transactions in physical stores or online transactions. In some embodiments, the interface may comprise information about other indirect users and entities that the token is shared with 412. In this regard the shared entity 412 may indicate entities and/or indirect user that possess the front end resource data structure information, token identifiers and the like. For example, the system may determine that the user provided the front end resource data structure information to an entity while executing a transaction. In this regard the system may determine the shared entity 412 based on analyzing the transaction history of the front end resource data structure. As another example, the system may determine that the user "pushed" (shared) a front end resource data structure to a wallet associated with an indirect user for use in transactions along with predetermined usage limits. In another aspect, shared entity 412 may reflect the front end resource data structures received from one or more entities or indirect users (for example, front end resource data structures owned by other entities or indirect users shared with or pushed to one or more of the user's wallets).

In some embodiments, the front end resource data structure 402 may be accompanied by one or more images 420 to enable the user to easily recognize of identify the front end resource data structure 402. In some embodiments images 420 comprise audiovisual elements extracted from various sources associated with the financial institution and/or wallet of the front end resource data structure 402, associated entity 410, shared users or other characteristics, either singularly or in combination to enable the user to easily identify and operate the front end resource data structure from the integrated interface without accessing separate interfaces. In some embodiments the front end resource data structure 402 may comprise a panel augmented with one or more front end resource data structure characteristics and images 420. In some embodiments the panel may comprise the front end resource data structure 402 and the characteristics (404-420) overlaid on the panel separate from each other, overlapping each other or in any other suitable manner. In some embodiments, the panel is actionable in that, the characteristics (404-420) may be displayed initially in a first manner (for example, partial display of information, concise display, in small size or relatively obscure view, display with hyperlinks) and may be displayed in a second manner (for example, with complete content, with additional relevant information, with a larger size, more legible view, with audiovisual elements, with change in color, size, appearance and/or orientation and the like) based on swipe patterns, user selection of a characteristic, voice commands, gestures and other actions of the user. In some embodiments, the display in the second manner may comprise generation of new dashboards or views, display of new windows or panels, redirecting the user to other parts of the integrated interface or other interfaces and the like.

In some embodiments, the system is configured to provide one or more dashboards based on the user input. In this regard the system is configured to sort, categorize, group, select and array the front end resource data structures for display on the integrated interface, in real time, in response to a request from a user. In some embodiments, the system may display all available front end resource data structures based on a suitable order, for example: usage frequency, recent use in transactions, and the like. In some embodiments, the integrated interface may comprise a dashboard menu screen capable of receiving user input directed to display of front end resource data structures. In some embodiments, the user may indicate a criteria or one or more conditions for display or sorting of the front end resource data structures on the integrated interface. The criteria or conditions may be based on one or more characteristics of the front end resource data structure, ordering or sorting rules and the like. In response the system may create a new dashboard for display on the integrated interface, based on the received criteria and display the front end resource data structures accordingly. For example, the user may request display of all tokens associated with a particular financial institution. The system may generate a new a real-time interactive technology resource interface 401, displaying the front end resource data structures associated with the financial institution as illustrated by FIG. 4B. In this regard, the elements on the real-time interactive technology resource interface 401 may be substantially similar to those illustrated in FIG. 4A.

In some embodiments the panels comprising the front end resource data structures 402 may comprise links or other functionality which enables creation of new windows, panels, pop-up boxes and the like to enable the user to perform the functions associated with the front end resource data structures, as illustrated by FIG. 4B. In some embodiments, the dashboard of the integrated interface may comprise graphical manipulation tools and control elements like checklists, tables, drop down lists, list boxes, pop-up menus, widgets, radio buttons, toggle switches, toolbars, text boxes and the like to enable user selection of parameters, navigation through the interface, user input of one or more parameters, and display of confirmation or output. In some embodiments, the interface enables the user to modify parameters associated with individual front end resource data structures or modify parameters associated with a group of front end resource data structures in a dashboard altogether. For example, a toggle switch or a slider 414 is illustrated in FIG. 4A, although other graphical control elements may be used in various embodiments. The toggle switch 414 may comprise an indicator 418 that is displaced corresponding to the variation of a value of a parameter, the levels of variation being indicated by the limit bar 416. Although three levels of variation are illustrated in the limit bar 416, more or fewer levels of variation or alternatives/preferences may be provided to the user. Each front end resource data structure 402 may be associated accompanied by one or more toggle switches 414. The toggle switches may enable the user to modify the parameters associated with the token. In some embodiments, the toggle switches indicate the current status of the parameter and also indicate the modification of the parameter either in response to receiving an input from the user, or in response to automatic modifications by the systems. For example, the toggle switches 414 may be configured to activate and/or deactivate, or delete the financial instrument in response to receiving user input and thereby indicating the availability of the front end resource data structure for use in transactions.

FIG. 4B illustrates the real-time interactive technology resource interface 401 having a presentation of a first front end data structure 202a (along with its parameters such as storage location 232A), and associated data transformation links 1 (displayed in an interactive graphical user element such as a pop-up) comprising a first device application resource data structure 204a stored at storage location 234a, and one or more first entity resource data structures 206a (and/or 208a) stored at storage locations 236a (and/or 238a), respectively. The real-time interactive technology resource interface 401 may further present graphical elements associated with a second front end data structure 202b (along with its parameters such as storage location 232B), and associated data transformation links 2 (displayed in an interactive graphical user element such as a pop-up) comprising a second device application resource data structure 204b stored at storage location 234b, and a second entity resource data structure 206b stored at storage location 236b. The real-time interactive technology resource interface 401 may further present graphical elements associated with a third front end data structure 202c (along with its parameters such as storage location 232A), and associated data transformation links 3 (displayed in an interactive graphical user element such as a pop-up) comprising a third device application resource data structure 204c stored at storage location 234c, and a third entity resource data structure 206c stored at storage location 236c.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent application:

| U.S. patent application Ser. No. | Title | Filed On |
| --- | --- | --- |
| To be assigned | SYSTEM FOR IDENTIFICATION AND MANAGEMENT OF LAYERED DEPENDENT RESOURCE DISTRIBUTION DEVICES | Concurrently herewith |

The invention claimed is:

1. A system for dynamic linking of resource data structures across distributed networks, wherein the system is structured for enhancing data security by evaluating and determining iterations of data transformations associated with resource data structures across networks and establishing deletion and usage modification mechanisms for stored unauthorized downstream iterations, the system comprising:
at least one memory device with computer-readable program code stored thereon;
at least one communication device;
at least one processing device operatively coupled to the at least one memory device and the at least one communication device, wherein executing the computer-readable code is configured to cause the at least one processing device to:
receive, from a first network device, a technology resource request associated with determining data transformations associated with a first front end resource data structure associated with a user;
determine one or more resource data activities performed using the first front end resource data structure;
determine, for each of the one or more resource data activities, an associated downstream entity network that was a recipient of data associated with the first front end resource data structure;
construct a downstream data transformation query for an entity network system of each of the one or more downstream entity networks, such that the downstream data transformation query is structured to retrieve a response from the entity network system of each of the one or more downstream entity networks regarding whether the one or more downstream entity networks has created a data transformation associated with the first front end resource data structure;
transmit, to each of the entity network system of the one or more downstream entity networks, the associated downstream data transformation query;
receive, from a first entity network system of a first downstream entity network of the one or more downstream entity networks, a first entity response indicating that a first entity resource data structure associated with the first front end resource data structure was created by the first downstream entity network, wherein the first entity resource data structure is a downstream transformation of the first front end resource data structure;
in response to the first entity response, link the first front end resource data structure and the first entity resource data structure;
construct a real-time interactive technology resource interface such that the technology resource interface is structured to present graphical interface objects associated with the link between the first front end resource data structure and the first entity resource data structure; and
initiate presentation, via a display device of a user device associated with the user, of the real-time interactive technology resource interface.

2. The system of claim 1, wherein determining one or more resource data activities performed using the first front end resource data structure further comprises:
determining a user device resource application stored on the user device where the user has input data associated with the first front end resource data structure;
analyzing the user device resource application to determine whether the user device resource application has created a data transformation associated with the first front end resource data structure;
identifying a first device application resource data structure associated with the first front end resource data structure stored by the user device resource application, wherein the first device application resource data is a downstream transformation of the first front end resource data structure and an upstream transformation of the first entity resource data structure; and
determining the one or more resource data activities based on activities of the user device resource application.

3. The system of claim 2, wherein executing the computer-readable code is configured to further cause the at least one processing device to:
- link (i) the first front end resource data structure and the first device application resource data structure, and (ii) the first device application resource data structure and the first entity resource data structure; and
- construct the real-time interactive technology resource interface such that the technology resource interface is structured to present graphical interface objects associated with the links between the first front end resource data structure, the first device application resource data, and the first entity resource data structure.

4. The system of claim 2, wherein determining one or more resource data activities performed using the first front end resource data structure further comprises:
- determining a creation time associated with the first device application resource data structure by the user device resource application;
- determining an activity log associated with the first entity resource data structure; and
- truncating the activity log based on the creation time associated with the first device application resource data structure such that the truncated activity log comprises the one or more resource data activities performed using the first front end resource data structure.

5. The system of claim 2, wherein determining one or more resource data activities performed using the first front end resource data structure further comprises determining activities performed by the user device resource application using the first device application resource data structure.

6. The system of claim 2, wherein determining, for each of the one or more resource data activities, the associated downstream entity network, further comprises tracking resource data transmissions associated with the one or more resource data activities.

7. The system of claim 2, wherein executing the computer-readable code is configured to further cause the at least one processing device to:
- determine a modification to the data associated with the first front end resource data structure;
- update the data associated with the first front end resource data structure to create an updated front end resource data structure;
- determine redundant data associated with downstream transformations of the first front end resource data structure, comprising determining (i) the first device application resource data structure constructed by the user device resource application, and (ii) the first entity resource data structure constructed by the first downstream entity network;
- transmit a first control instruction to the user device resource application to modify the first device application resource data structure to be compatible with updated front end resource data structure; and
- transmit a second control instruction to the first downstream entity network to modify the first entity resource data structure to be compatible with the updated front end resource data structure.

8. The system of claim 7, wherein determining the modification to the data associated with the first front end resource data structure comprises determining (i) addition of new data, (ii) removal of data, and/or (iii) alteration of data.

9. The system of claim 7, wherein determining the modification to the data associated with the first front end resource data structure comprises receiving, via the real-time interactive technology resource interface at the display device of the user device, a user request to update data associated with the first front end resource data structure.

10. The system of claim 2, wherein executing the computer-readable code is configured to further cause the at least one processing device to:
- receive, via the real-time interactive technology resource interface at the display device of the user device, a user request to delete the first front end resource data structure;
- delete the first front end resource data structure;
- determine downstream transformations of the first front end resource data structure, comprising determining (i) the first device application resource data structure constructed by the user device resource application, and (ii) the first entity resource data structure constructed by the first downstream entity network;
- transmit a first control instruction to the user device resource application to delete the first device application resource data structure; and
- transmit a second control instruction to the first downstream entity network to delete the first entity resource data structure.

11. The system of claim 2, wherein executing the computer-readable code is configured to further cause the at least one processing device to:
- receive, via the real-time interactive technology resource interface at the display device of the user device, a user request to delete the first front end resource data structure;
- delete the first front end resource data structure;
- determine downstream transformations of the first front end resource data structure, comprising determining (i) the first device application resource data structure constructed by the user device resource application, and (ii) the first entity resource data structure constructed by the first downstream entity network; and
- in response to a user input via the real-time interactive technology resource interface at the display device of the user device, transmit a second control instruction to the first downstream entity network to delete the first entity resource data structure such that (i) the first entity resource data structure is uncoupled from the first device application resource data structure, and while (ii) the first device application resource data structure is structured to be utilized by the user device resource application.

12. The system of claim 1, wherein the link between the first front end resource data structure and the first entity resource data structure is temporary, wherein executing the computer-readable code is configured to further cause the at least one processing device to:
- present, via the real-time interactive technology resource interface at the display device of the user device, a link check notification to the user;
- in response to a successful link response from the user, couple the first front end resource data structure and the first entity resource data structure; and
- present, via the real-time interactive technology resource interface at the display device of the user device, a confirmation of the coupling of the first front end resource data structure and the first entity resource data structure.

13. The system of claim 1, wherein the link between the first front end resource data structure and the first entity resource data structure is temporary, wherein executing the computer-readable code is configured to further cause the at least one processing device to:

present, via the real-time interactive technology resource interface at the display device of the user device, a link check notification to the user;

in response to an unsuccessful link response from the user, initiate deletion of the first entity resource data structure at the first downstream entity network; and present, via the real-time interactive technology resource interface at the display device of the user device, a confirmation of the deletion the first entity resource data structure upon determining completion of the deletion of the first entity resource data structure at the first downstream entity network.

14. The system of claim 1, wherein the real-time interactive technology resource interface is structured to present graphical interface objects associated with a second front end resource data structure, and associated downstream transformations comprising (i) a second device application resource data structure constructed by a user device resource application, and (ii) a second entity resource data structure constructed by a second downstream entity network of the one or more downstream entity networks, executing the computer-readable code is configured to further cause the at least one processing device to:

receive, via the real-time interactive technology resource interface at the display device of the user device, a user request to delete the second front end resource data structure; and initiate deletion of the second front end resource data structure, the second device application resource data structure, and/or the second entity resource data structure based on the user request, such that the first device application resource data structure is structured to be utilized by the user device resource application and the first entity resource data structure is structured to be utilized by the first downstream entity network.

15. A computer program product for dynamic linking of resource data structures across distributed networks, wherein the computer program product is structured for enhancing data security by evaluating and determining iterations of data transformations associated with resource data structures across networks and establishing deletion and usage modification mechanisms for stored unauthorized downstream iterations, the computer program product comprising a non-transitory computer-readable storage medium having computer-executable instructions to:

receive, from a first network device, a technology resource request associated with determining data transformations associated with a first front end resource data structure associated with a user;

determine one or more resource data activities performed using the first front end resource data structure;

determine, for each of the one or more resource data activities, an associated downstream entity network that was a recipient of data associated with the first front end resource data structure;

construct a downstream data transformation query for an entity network system of each of the one or more downstream entity networks, such that the downstream data transformation query is structured to retrieve a response from the entity network system of each of the one or more downstream entity networks regarding whether the one or more downstream entity networks has created a data transformation associated with the first front end resource data structure;

transmit, to each of the entity network system of the one or more downstream entity networks, the associated downstream data transformation query;

receive, from a first entity network system of a first downstream entity network of the one or more downstream entity networks, a first entity response indicating that a first entity resource data structure associated with the first front end resource data structure was created by the first downstream entity network, wherein the first entity resource data structure is a downstream transformation of the first front end resource data structure;

in response to the first entity response, link the first front end resource data structure and the first entity resource data structure;

construct a real-time interactive technology resource interface such that the technology resource interface is structured to present graphical interface objects associated with the link between the first front end resource data structure and the first entity resource data structure; and initiate presentation, via a display device of a user device associated with the user, of the real-time interactive technology resource interface.

16. The computer program product of claim 15, wherein determining one or more resource data activities performed using the first front end resource data structure further comprises:

determining a user device resource application stored on the user device where the user has input data associated with the first entity resource data structure;

analyzing the user device resource application to determine whether the user device resource application has created a data transformation associated with the first front end resource data structure;

identifying a first device application resource data structure associated with the first front end resource data structure stored by the user device resource application, wherein the first device application resource data is a downstream transformation of the first front end resource data structure and an upstream transformation of the first entity resource data structure; and determining the one or more resource data activities based on activities of the user device resource application.

17. The computer program product of claim 16, wherein the non-transitory computer-readable storage medium further comprises computer-executable instructions to:

receive, via the real-time interactive technology resource interface at the display device of the user device, a user request to delete the first front end resource data structure;

delete the first front end resource data structure;

determine downstream transformations of the first front end resource data structure, comprising determining (i) the first device application resource data structure constructed by the user device resource application, and (ii) the first entity resource data structure constructed by the first downstream entity network;

transmit a first control instruction to the user device resource application to delete the first device application resource data structure; and transmit a second control instruction to the first downstream entity network to delete the first entity resource data structure.

18. A computer implemented method for dynamic linking of resource data structures across distributed networks, wherein the computer implemented method is structured for enhancing data security by evaluating and determining iterations of data transformations associated with resource data structures across networks and establishing deletion and usage modification mechanisms for stored unauthorized downstream iterations, the computer implemented method comprising:

receiving, from a first network device, a technology resource request associated with determining data transformations associated with a first front end resource data structure associated with a user;

determining one or more resource data activities performed using the first front end resource data structure;

determining, for each of the one or more resource data activities, an associated downstream entity network that was a recipient of data associated with the first front end resource data structure;

constructing a downstream data transformation query for an entity network system of each of the one or more downstream entity networks, such that the downstream data transformation query is structured to retrieve a response from the entity network system of each of the one or more downstream entity networks regarding whether the one or more downstream entity networks has created a data transformation associated with the first front end resource data structure;

transmitting, to each of the entity network system of the one or more downstream entity networks, the associated downstream data transformation query;

receiving, from a first entity network system of a first downstream entity network of the one or more downstream entity networks, a first entity response indicating that a first entity resource data structure associated with the first front end resource data structure was created by the first downstream entity network, wherein the first entity resource data structure is a downstream transformation of the first front end resource data structure;

in response to the first entity response, linking the first front end resource data structure and the first entity resource data structure;

constructing a real-time interactive technology resource interface such that the technology resource interface is structured to present graphical interface objects associated with the link between the first front end resource data structure and the first entity resource data structure; and initiating presentation, via a display device of a user device associated with the user, of the real-time interactive technology resource interface.

19. The computer implemented method of claim 18, wherein determining one or more resource data activities performed using the first front end resource data structure further comprises:

determining a user device resource application stored on the user device where the user has input data associated with the first entity resource data structure;

analyzing the user device resource application to determine whether the user device resource application has created a data transformation associated with the first front end resource data structure;

identifying a first device application resource data structure associated with the first front end resource data structure stored by the user device resource application, wherein the first device application resource data is a downstream transformation of the first front end resource data structure and an upstream transformation of the first entity resource data structure; and determining the one or more resource data activities based on activities of the user device resource application.

20. The computer implemented method of claim 19, wherein the method further comprises:

receiving, via the real-time interactive technology resource interface at the display device of the user device, a user request to delete the first front end resource data structure;

deleting the first front end resource data structure;

determining downstream transformations of the first front end resource data structure, comprising determining (i) the first device application resource data structure constructed by the user device resource application, and (ii) the first entity resource data structure constructed by the first downstream entity network;

transmitting a first control instruction to the user device resource application to delete the first device application resource data structure; and transmitting a second control instruction to the first downstream entity network to delete the first entity resource data structure.

* * * * *